A. BIGELOW.
Lemon-Squeezers.
No. 136,023.　　　　　　　　　　　Patented Feb. 18, 1873.
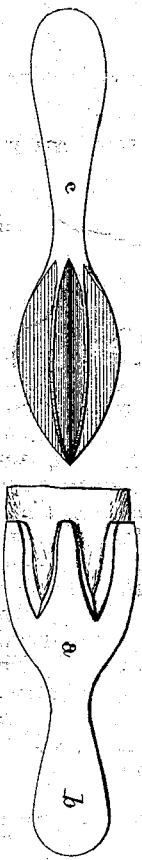
WITNESSES.　　　　　　　　　　　INVENTOR.

UNITED STATES PATENT OFFICE.

ARTEMAS BIGELOW, OF KILLINGWORTH, CONNECTICUT.

IMPROVEMENT IN LEMON-SQUEEZERS.

Specification forming part of Letters Patent No. 136,023, dated February 18, 1873.

*To all whom it may concern:*

Be it known that I, ARTEMAS BIGELOW, of Killingworth, county of Middlesex and State of Connecticut, have invented certain new and useful Improvements in Lemon-Squeezers, of which the following is a specification:

The nature of my invention relates to the construction of a device for extracting the juice from lemons; and consists in a cup-shaped holder, provided with a suitable handle for holding the lemon while the juice is being extracted by rotating the screw back and forth, as will hereafter be more fully described.

The accompanying drawing represents a side elevation of my invention, the two parts being shown in their relative positions as they are used.

$a$ represents a cup-shaped body, provided with a suitable handle, $b$, and which is of sufficient capacity to hold lemons of different sizes. The sides of this cup may, if desired, be slotted, or divided into divisions of any form or number, the inner edges of these slots being cut away at an acute angle. $c$ represents the ordinary lemon-screw.

When the lemon is placed in the cup, and the screw pressed against it and rotated back and forth, the pulp and juice are rapidly extracted; the edges of the slots serving to hold the lemon in place, and the handle of the cup to prevent the juice from getting upon the hands.

Having thus described my invention, what I claim as new, and desire to secure by Letters Patent, is—

1. The cup $a$ provided with a handle, $b$, substantially as set forth.

2. The cup, in combination with the screw $c$, substantially as described.

In testimony that I claim the foregoing as my invention I hereunto affix my signature.

ARTEMAS BIGELOW.

Witnesses:
J. HAMILTON LEE,
F. R. BIGELOW.